United States Patent [19]

Chiariglione et al.

[11] Patent Number: 4,581,638

[45] Date of Patent: Apr. 8, 1986

[54] METHOD OF AND SYSTEM FOR CODING A TWO-DIMENSIONAL DATA ARRAY

[75] Inventors: Leonardo Chiariglione, Villar Dora; Mario Guglielmo, Montalenghe, both of Italy

[73] Assignee: CSELT Centro Studi e Laboratori Telecomunicazioni S.p.A., Turin, Italy

[21] Appl. No.: 515,362

[22] Filed: Jul. 19, 1983

[30] Foreign Application Priority Data

Jul. 19, 1982 [IT] Italy ............................... 67918 A/82

[51] Int. Cl.[4] .................. H04N 7/12; H04N 1/40; H04N 1/417; H04N 1/419
[52] U.S. Cl. .................................... 358/135; 358/260; 358/261; 358/133
[58] Field of Search ............... 358/133, 138, 260, 261, 358/135

[56] References Cited

U.S. PATENT DOCUMENTS

| 3,984,626 | 10/1976 | Mounts et al. | 358/133 |
| 4,189,748 | 2/1980 | Reis | 358/133 |
| 4,242,733 | 12/1980 | Deal | 358/260 |
| 4,242,734 | 12/1980 | Deal | 358/260 |
| 4,268,861 | 5/1981 | Schreiber et al. | 358/138 |
| 4,292,651 | 9/1981 | Kretz et al. | 358/135 |
| 4,447,886 | 5/1984 | Meeker | 358/133 |

OTHER PUBLICATIONS

"Image Coding by Linear Transformation and Block Quantization" by Habibi et al., IEEE Transactions on Communication Technology, vol. Com.19, No. 1, Feb. 1971.
Encoding of a Counting Rate Source . . . " by Algazi et al., Microwave Research Institute, Symposia Series, vol. 19, 1970.
Use of Activity Classes in Adaptive Transform Image Coding by Gimlett, IEEE Transactions on Communications, Jul. 1975.

Hadamard Transform Image Coding by Pratt et al., Proceedings of the IEEE, vol. 57, No. 1, Jan. 1969.
Adaptive Transform Image Coding for Human Analysis by Mitchell et al., CH1435-IEEE 1979.
Adaptive Coding of Monochrome and Color Images by Wen-Hsiung Chen et al., IEEE Transactions on Communications, vol. Com.25, No. 11, Nov. 1977.

Primary Examiner—Douglas W. Olms
Assistant Examiner—Wellington Chin
Attorney, Agent, or Firm—Karl F. Ross; Herbert Dubno

[57] ABSTRACT

A two-dimensional data array, such as an orthogonally scanned television image, is divided into a multiplicity of elemental blocks each containing a given number of PCM samples which are converted by linear transformation into a series of coefficients to be quantized for transmission to a remote receiver. The data blocks are processed one at a time by an iterative coder which allots a progressively increasing number of bits to a given block in successive operating stages, the bits being allocated to the several coefficients of the block according to the position of the barycenter of their signal energy assigning the block to one of K classes. An initial overall reconstruction error, computed from the coefficients of a block with no bits yet available for quantization, is updated with each bit allotment in the course of an iteration in which a selected coefficient is subjected to simultaneous coding with S quantizers differing from one another in their quantum steps. The coding operations of the S concurrently active quantizers have different error-reducing effects and the resulting minimum error is compared with a threshold which itself may be variable according to the activity of the image block being processed. When the residual overall error falls below that threshold, processing is terminated and the bits used in the coding of each coefficient are sequentially sent out together with a count of the total number of bits allotted to the block and a parameter k indicating its classification, this information enabling the receiver to reconstruct the image within the limits of the tolerated residual error.

19 Claims, 8 Drawing Figures

METHOD OF AND SYSTEM FOR CODING A TWO-DIMENSIONAL DATA ARRAY

FIELD OF THE INVENTION

Our present invention relates to a method of and a system for coding a two-dimensional data array, referred to hereinafter as an image, whose contents can be represented by an orthogonal matrix of quantizable coefficients reflecting the energy content of associated image points.

BACKGROUND OF THE INVENTION

The classical way of transmitting the contents of orthogonally scannable data arrays such as television images is to sample them line by line with pulse-code modulation (PCM) and reorganize the serially arriving PCM samples into a frame at the receiving end. Numerous attempts have been made to reduce the bit rate required for such transmission without sacrificing significant details in the visual representation. Various transcoding techniques designed to reduce the number of bits include linear transformations of the Fourier, Hadamard and other types described, for example, in an article titled *Hadamard Transform Image Coding* by William K. Pratt, Julius Kane and Harry C. Andrews, Proceedings of the IEEE, Vol. 57, No. 1, January 1969, pages 58–65, and an article titled *Image Coding by Linear Transformation and Block Quantization* by Ali Habibi and Paul A. Wintz, IEEE Transactions on Communication Technology, Vol. Com-19, No. 1, February 1971, pages 50–63.

By subdividing each array or frame into a multiplicity of elemental data blocks, generally of rectangular shape, it is possible to allocate different numbers of bits to the several blocks in accordance with their relative degrees of activity in terms of signal energy. Reference in this connection may be made to such publications as an article titled *Use of "Activity" Classes in Adaptive Transform Image Coding* by James I. Gimlett, IEEE Transactions on Communications, July 1975, pages 785 and 786; an article titled *Adaptive Coding of Monochrome and Color Images* by Wen-Hsium Chen and C. Harrison Smith, IEEE Transactions on Communications, Vol. Com.-25, No. 11, November 1977, pages 1285–1292; and an article titled *Adaptive Transform Image Coding for Human Analysis* by O. R. Mitchell and Ali Tabatabai, ICC 1979, Boston, pages 23.2.1–23.2.5.

Though the idea of adaptive coding is sound, the techniques hitherto proposed have various drawbacks. Thus, there is no known way of determining "activity" in a manner which would definitely reduce the reconstruction error of each block—i.e. the distortion inherent in the limitation of the bit allocation—to a tolerable value avoiding the loss of significant details. The utilization of a necessarily small number of empirically established bit-assignment tables (four of them in the systems described in the articles referred to) cannot provide an optimum bit allocation for each block. Moreover, selection of the table best suited to minimize the reconstruction error would require a successive testing of all available tables in each instance.

A paper titled *Encoding of a Counting Rate Source with Orthogonal Functions* by V. R. Algazi and D. J. Sakrison, presented at the Symposium on Computer Processing in Communications held Apr. 8–10, 1969 at the Polytechnic Institute of Brooklyn, New York (published 1970 in Symposia Series, Vol. 19 of Microwave Research Institute, pages 85–99), discusses varying the law of quantizing for the purpose of coding a given coefficient with the least number of quantum steps (i.e. the largest separation of quantization levels) compatible with a permissible rate of distortion; according to this paper, a Huffman coder can be used for ascribing shorter binary sequences to the more roughly quantized levels. These authors, however, do not suggest the use of such different quantizing laws for the adaptive coding of data blocks.

OBJECTS OF THE INVENTION

The general object of our present invention, therefore, is to provide an improved method of and system for the coding of two-dimensional data arrays—specifically, video images or the like—with a reduced bit rate which adapts itself, both in the total bit number and in their allocation to the coefficients of a data block to be coded, individually to the activity of each block in a manner approximating a wide variety of data or image configurations with a largely uniform degree of residual distortion.

More particularly, our invention aims at providing a highly flexible bit-allocating procedure designed to vary from one block to another while facilitating faithful replication—within the limits of permissible residual distortion—of the original coefficients at a remote receiver.

SUMMARY OF THE INVENTION

Our invention makes use of an iterative coding process and means with a succession of operating stages in which a progressively increasing number of bits (starting from zero) are allotted to a data block whose coefficients are to be quantized, each stage involving the allocation of a newly allotted bit to one selected coefficient. Prior to any bit allotment, an initial overall reconstruction error is determined from the absolute magnitudes of these coefficients. Thereafter, in each stage, we ascertain the effect of quantization of a selected coefficient with a bit allocated to it in that stage upon the overall reconstruction error in order to decide whether a final reduction of that error to a limited residual value—not exceeding an established distortion threshold—has been achieved or whether further bits must be allotted to the block for this purpose. When the residual error is found to be equal to or less than that distortion threshold, the bits coding all the coefficients of the block are sent out over a signal channel, together with advance information enabling a remote receiver to reconstruct these coefficients within the limits of permissible distortion.

With only one bit per stage allotted to the block being processed, a count of the allotted bits enables the identification of the coefficient selected in each stage according to a pre-established program. The advance information preceding the outgoing quantizing bits should then include the total final bit count in order to inform the remote receiver of the length of the sequence used for coding a block. Also forming part of this information, according to the preferred embodiment described hereinafter, is an identification of one of several classes to which each block is being assigned, prior to processing, according to the location within the block of a point of energy concentration referred to hereinafter as the barycenter. This location, determined from the absolute magnitudes of all the coefficients of a block, may be defined as the geometrical center or mean position of these absolute magnitudes calculated in a manner analogous to the calculation of the center of gravity of a physical mass; as a practical matter, and as more fully described hereinafter, the block can be subdivided into a multiplicity of smaller areas, the area with the highest amount of signal energy being designated as the barycenter. In any case, the preselection of a coefficient (in terms of its position within the sequence in which the coefficients of a block are generated) in any stage depends on the class to which the block has been assigned.

Pursuant to a further feature of our invention, the coefficient selected for bit allocation in any stage is subjected to a plurality of simultaneous quantizations according to different modes. The effects of these simultaneous quantizations upon the overall reconstruction error are separately determined by a discriminator which computes in each instance the resulting reconstruction error. The discriminator marks one of several concurrently activated quantizers as the one contributing most to a reduction of this error up to the current stage; the error as reduced by this particular quantizer is compared with the distortion threshold and the advance information preceding the outgoing quantizing bits includes an identification of the quantization mode used most effectively in the processing of the block. For this purpose it will be most convenient to send out the bits utilized with the quantization mode which has made the greatest contribution in the last operating stage.

The various modes of quantization, in the embodiment described hereinafter, utilize different quantum steps with a given number of allocated bits. In our preferred system, each coefficient to be coded is assigned a maximum number of bits equal to or greater than the number of bits actually allocated thereto in the current and preceding stages of operation. Quantizers using the same number of bits—and thus having the same number or quantization levels—with different quantum steps are considered a family and are activated simultaneously; those with identical quantum steps but different bit numbers form a group so that one member of each group is activated in any operating stage by a programmer forming part of the iterative coding means.

BRIEF DESCRIPTION OF THE DRAWING

The above and other features of our invention will now be described in detail with reference to the accompanying drawing in which.

SPECIFIC DESCRIPTION

Figure 1:
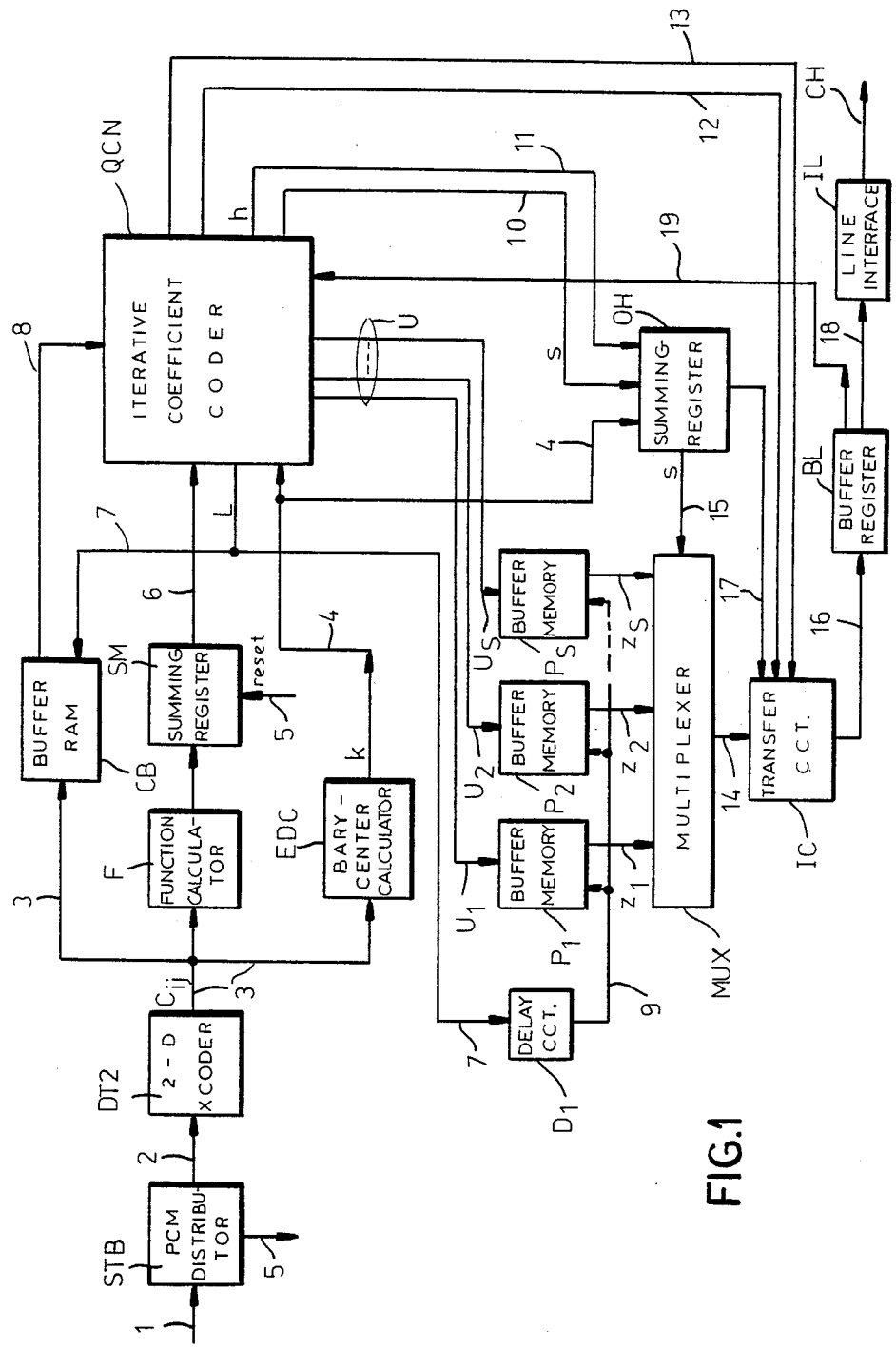
FIG. 1 shows the overall layout of an image-coding system according to our invention.
Figure 4:
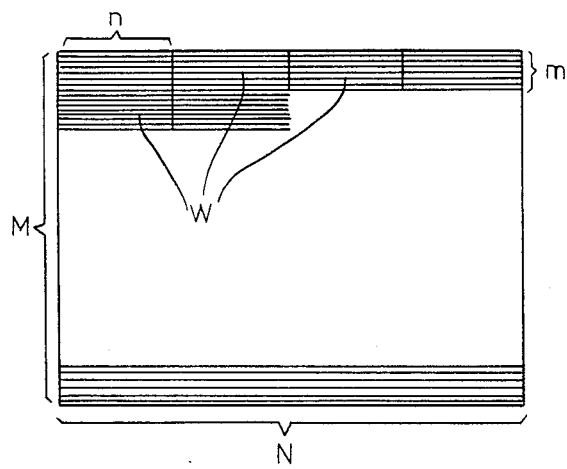
FIG. 4 diagrammatically represents the image to be coded, shown subdivided into a multiplicity of elemental blocks.

The system shown in FIG. 1 comprises a distributor STB receiving PCM samples of an orthogonally scanned image arriving on a line 1, specifically a video frame with M lines of N picture elements or pixels each as illustrated in FIG. 4. The frame is divided into a multiplicity of rectangular image blocks W encompassing m lines of n pixels each, with m and n respectively divisible into M and N. A row of blocks W may be defined as a stripe of m lines; the samples representing the m·n pixels of each block are emitted in series on an output line 2 with columnar (vertical) scanning of the several blocks of a stripe so that their contents in the form of m·n PCM samples are consecutively extracted. Each block is processed independently of the others, in a treatment period individually assigned to it, by the circuitry downstream of distributor STB.

Figure 5:
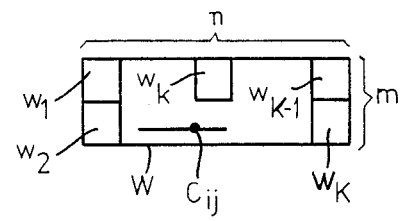
FIG. 5 shows a further subdivision of an image block of FIG. 4.

Line 2 extends to a two-dimensional transcoder DT2 which converts the samples of each block into a set of coefficients by any of the known linear-transformation techniques such as those described in the various prior publications identified above. With the number of coefficients assumed to equal the number of original samples, i.e. m·n, each coefficient $C_{ij}$ is identified by its position in the sequence pertaining to the block, with $1 \leq i \leq m$ and $1 \leq j \leq n$. The position assigned to one such coefficient $C_{ij}$ within the associated block W has been illustrated in FIG. 5 which also shows the block subdivided into a multiplicity of smaller areas $w_1, w_2, \ldots w_k, \ldots w_{K-1}, w_K$ (only a few of which have been specifically indicated).

An output line 3 of component DT2 terminates in parallel at two arithmetic units F and EDC as well as at a buffer register CB of the random-access (RAM) type. Component EDC calculates, from the absolute magnitudes of all the coefficients $C_{ij}$ of a given block, the site of greatest concentration of the signal energy represented by these coefficients which has already been referred to as the barycenter. A signal emitted by calculator EDC on a line 4 represents the index k of the area of the block in which the barycenter is found to be located; this index, accordingly, designates one of the areas $w_1-w_K$ shown in FIG. 5. Index k characterizes the block W as belonging to one of K classes whose significance will become subsequently apparent.

Component F calculates for each coefficient $C_{ij}$ a partial initial reconstruction error which would exist if such coefficient were quantized with the value zero. Each of these initial errors may simply be the square of the value of the corresponding coefficient but could be weighted on the basis of visibility as a function of frequency, e.g. as known from the above-identified article by Mitchell et al. Calculator F works into a summing register SM which, after being cleared by a resetting signal on a lead 5 emitted by distributor STB at the beginning arrival of samples from each image block, adds up the partial initial errors to provide an overall reconstruction error for the block which it transmits on a line 6 to an iterative coefficient coder QCN more fully described hereinafter with reference to FIG. 2. The coder generates addresses $L = i \cdot m + j$ of coefficients stored in buffer register CB which are sequentially delivered to that register on a line 7 also extending to a delay circuit $D_1$. Register CB, when so addressed, supplies coder QCN with the coefficient $D_{ij}$ stored in the corresponding cell thereof. The classification parameter k present on line 4 arrives at coder QCN and, in parallel therewith, at a section of another summing register OH which has two further sections respectively receiving a selection signal s and a bit count h on associated output lines 10 and 11 of the coder.

An output bus U of coder QCN comprises a plurality of line multiples $U_1, U_2, \ldots U_S$ terminating at respective buffer memories $P_1, P_2, \ldots P_S$ which are jointly addressable by the data work L on line 7 appearing on an extension 9 of that line after a delay in circuit $D_1$ sufficient to make available new data for entry in these buffer memories. Outputs $z_1, z_2, \ldots z_S$ thereof are connected to respective inputs of a multiplexer MUX whose own output 14 terminates at a transfer circuit IC. Multiplexer MUX is settable, in response to the magnitude of selection signal s on line 10 (which may range from 1 through S), by an instruction on an output 15 of buffer register OH which has another output 17 connected to transfer circuit IC. Two other output lines 12 and 13 of coder QCN also terminate at circuit IC; line 12 carries ancillary information relating to bit combinations fed into memories $P_1$-$P_S$ via bus U whereas line 13 delivers an enabling command causing circuit IC to couple a line 16 first to the register output 17 and then to the multiplexer outut 14. Line 16 extends to a buffer register BL from which a connection 18 leads to a line register IL working into a transmitting channel CH. Register IL, whose operation is timed by a nonillustrated clock also controlling the other components of the system, serves to equalize the spacing of outgoing bits emitted first by register OH and then by one of the buffer memories $P_1$-$P_S$ selected in accordance with instruction s as last updated. Advance knowledge of the selected quantizing mode represented by signal s, of the classification parameter k and of a final bit count H enables the remote receiver to reconstruct the image block from the data bits passing over channel CH.

Register BL has another output lead 19 extending to coder QCN for informing same of the degree to which its storage capacity is being utilized, thereby modifying an error threshold within the coder in order to avoid an overload condition while providing greater fidelity in situations of reduced activity. These threshold changes may be based on the absolute loading of register BL or on variations of bit count H from one block to another.

In successive operating stages, referred to hereinafter as iterations, coder QCN progressively increases the number of bits allotted to a given image block for an orderly representation of its coefficients. A single bit is allocated in a first iteration to a coefficient whose address L is selected according to the parameter k present on line 4. During each subsequent iteration, another bit is allotted to the block and is allocated to a coefficient which may or may not have been selected previously. Signal h represents a count of the bits so allotted and thus is incremented by 1 in each iteration. This number h must reach a minimum value $H_{min}$ before a reduction of the overall reconstruction error to a residual magnitude determined by the aforementioned threshold results in the enabling command on lead 13; count h must not however, exceed a maximum value $H_{max}$ whose attainment also gives rise to the enabling command on lead 13 and thus to the discharge of the contents of register OH and a selected buffer memory regardless of the residual error then existing.

Figure 2:
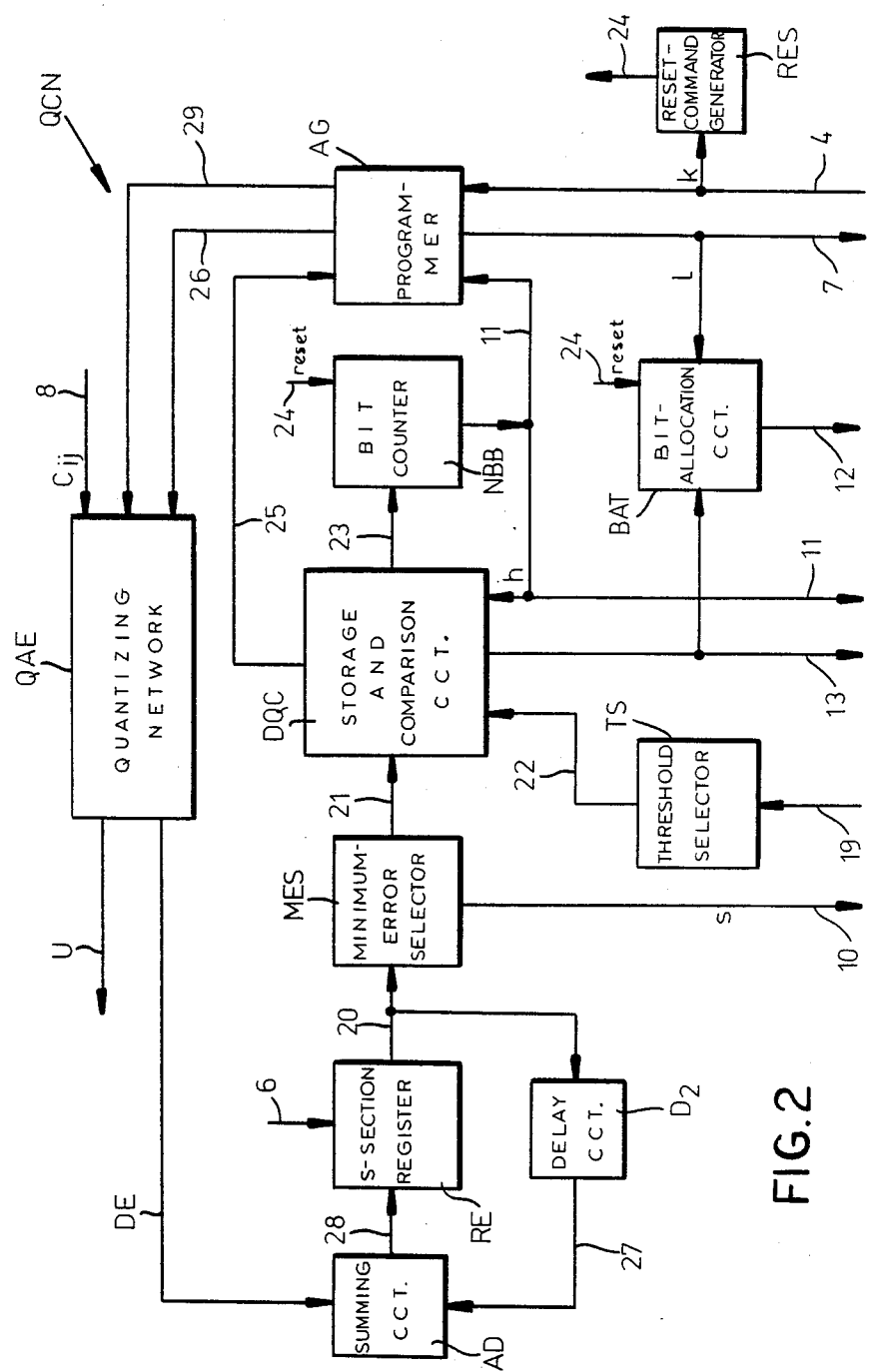
FIG. 2 shows details of a coefficient coder included in the system of FIG. 1.
Figure 7:
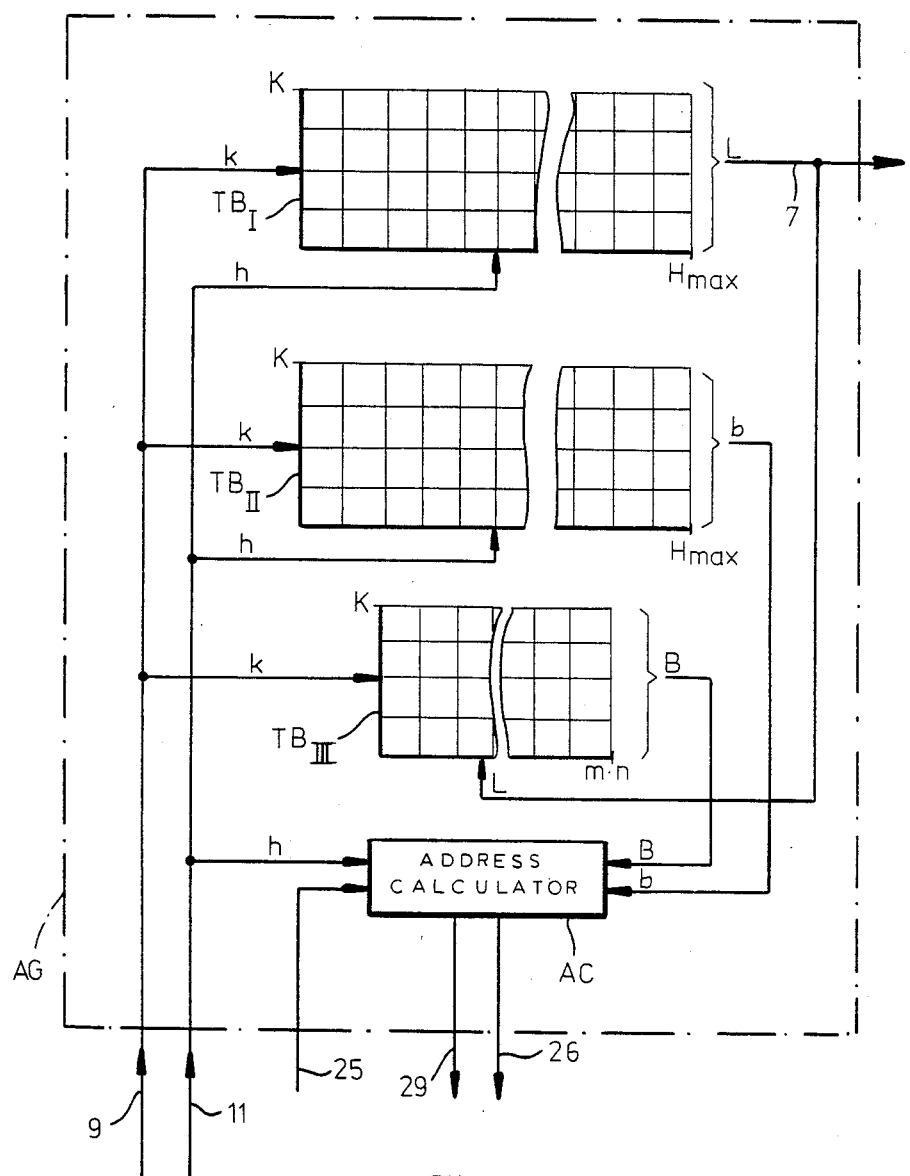
FIG. 7 is a diagrammatic representation of the structure of an address memory also shown as a rectangle in FIG. 2.

Reference will now be made to FIG. 2 showing the internal structure of coder QCN. Line 4, carrying the classification parameter k, terminates at a programmer AG more fully described hereinafter with reference to FIG. 7; a branch of this line also extends to a reset-command generator RES which, in response to the appearance of parameter k, energizes an output 24 to clear a pulse counter NBB and a bit-allocation circuit BAT at the beginning of each block-processing operation. Output lines 26 and 29 extend from the programmer AG to a quantizing network QAE shown in greater detail in FIG. 3. Network QAE also receives on line 8 each coefficient $C_{ij}$ called forth from buffer register CB (FIG. 1) by the address L appearing on line 7 which likewise originates at programmer AG. This address is further furnished to circuit BAT which accordingly is able to register during each iteration the identity of the coefficient to be coded with an additional bit. After the last iteration, therefore, circuit BAT has available the complete distribution of all the bits allotted to the block, adding up to the final count H. Upon the occurrence of the enabling signal on lead 13, which is also connected to an input of circuit BAT, the latter provides transfer circuit IC (FIG. 1) via line 12 with the number of bits allocated to each coefficient for which a bit combination is being extracted from the selected buffer memory $P_1$-$P_S$ by way of multiplexer MUX.

Lead 13 originates at a storage and comparison circuit DQC from which two other leads 23 and 25 respectively extend to pulse counter NBB and to programmer AG. Line 11, which carries the bit count h, extends from pulse counter NBB to programmer AG, to comparison circuit DQC and to the register OH of FIG. 1. Circuit DQC is also linked by a line 22 to the output of a threshold selector TS whose setting is controlled, as already described, by a signal from buffer register BL (FIG. 1) transmitted to it via line 19; this setting however, remains constant during the processing of any data block.

Network QAE has outputs connected on the one hand to the bus U, referred to in the description of FIG. 1, and to a similar bus DE terminating at a summing circuit AD. A bus 28 leads from circuit AD to a register RE which is divided into S sections, each of them being initially loaded with the overall reconstruction error appearing on the output line 6 of summing register SM (FIG. 1). A feedback connection 27 extends from an output 20 of register RE via a delay circuit $D_2$ to summing circuit AD; output 20 is connected to a minimum-error selector MES which compares at the end of each iteration the values stored in the several sections of register RE and thereupon emits a selection signal s on lead 10 as more fully discussed hereinafter. Selector MES has an output 21 delivering the updated overall error to comparison circuit DQC.

Figure 6:
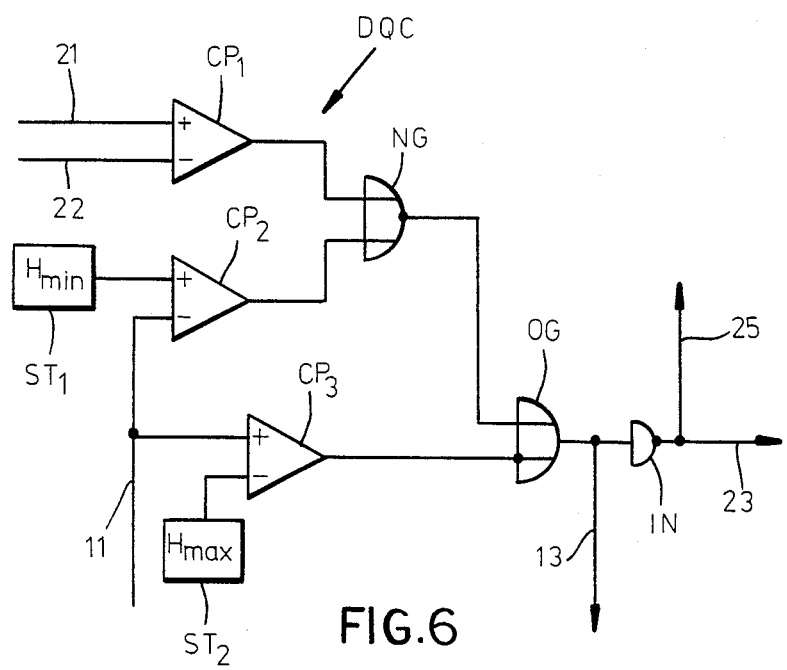
FIG. 6 shows details of a comparison circuit represented as a rectangle in FIG. 2.

The operation of circuit DQC will now be described with reference to FIG. 6 which shows three comparators $CP_1$, $CP_2$ and $CP_3$. Comparator $CP_1$ has an additive input and a subtractive input respectively tied to lines 21 and 22. Comparators $CP_2$ and $CP_3$ have subtractive inputs receiving the current bit count h from line 11, an additive input of comparator $CP_2$ being connected to a data store $ST_1$ containing a minimum final count $H_{min}$ while a corresponding input of comparator $CP_3$ is connected to a data store $ST_2$ containing the aforementioned maximum count $H_{max}$. Comparators $CP_1$ and $CP_2$ work into a NOR gate NG whose output is tied to a noninverting input of an OR gate OG also having an inverting input tied to The output of comparator $CP_3$. OR gate OG works directly into lead 13 and through an inverter IN into leads 23 and 25. After each iteration, under the control of the nonillustrted clock, comparator $CP_1$ determines whether or not a residual reconstruction error read out by selector MES from the lowest-content section of register RE (FIG. 2) has a value not exceeding the threshold set in selector TS. If this is the case, and if the bit count h has at least reached the value $H_{min}$ stored in component $ST_1$, comparators $CP_1$ and $CP_2$ are cut off so that NOR gate NG conducts and energizes the enabling lead 13 by way of OR gate OG. Such an enabling signal will also be emitted when comparator $CP_3$ is cut off as the count h on line 11 reaches the threshold $H_{max}$ stored in component $ST_2$. If neither of these events happens, invertyer IN is activated by a clock signal to energize leads 23 and 25; this steps the pulse counter NBB of FIG. 2 and also activates the programmer AG whose operation will now be described with reference to FIG. 7.

Programmer AG may be defined as essentially comprising K data stores each consisting of a triad of tables, one such triad being selected during the processing of each block in accordance with the parameter k appearing on line 4. In the schematic representation of FIG. 7, however, the K triads have been illustrated as three matrices or data tables $TB_I$, $TB_{II}$ and $TB_{III}$ each having K rows, the $k^{th}$ row being chosen in each matrix by the signal appearing on line 4. Each row of matrix $TB_I$ contains the addresses L of coefficients $C_{ij}$ to which bits are to be allocated in respective iterations marked by an incrementation of count h. The distribution of addresses L in the $k^{th}$ row of matrix TBhas been chosen on the basis of the location of the barycenter reflected in the value of k. Matrix $TB_I$, accordingly, has $H_{max}$ columns; this is also true of matrix $TB_{II}$ from which, upon each incrementation of count h, a value b is read out which represents the number of quantizing bits allocated up to that point to the coefficient concurrently identified by its address L extracted from matrix $TB_I$. That number b, of course, corresponds to the number of times the same address L has been extracted from matrix $TB_I$. The third matrix $TB_{III}$, which has the same number K of rows as the other two matrices, has n·m columns corresponding to the number of coefficient addresses L; this number, generally, will be substantially less than the maximum bit count $H_{max}$. On the basis of the address L concurrently read out on line 7 from matrix $TB_I$, matrix $TB_{III}$ emits a numerical value B stored in its $k^{th}$ row which constitutes the highest number of bits that can be allocated to the coefficient identified by address L, i.e. the value which the number b would have if the count h were equal to $H_{max}$.

The two numbers b and B are supplied to an address calculator AC also receiving the count h from line 11. Address calculator AC is activated by the enabling signal on lead 25 which also allows reading of the matrices $TB_I$-$TB_{III}$. Value B represents the address of a family of S quantizers in network QAE (FIGS. 2, 3) operating in different modes but with the same number of quantization levels. Value $b \leq B$ represents the number of bits available to each of the quantizers of the chosen family, as described hereinafter with reference to FIG. 8, for coding the coefficient read out at the address L from buffer register CB (FIG. 1). The operation of unit AG is so timed that, at the end of an iteration, calculator AC, on being enabled by a signal on lead 25, successively emits two quantizer addresses, namely a firt address $B+(b-1)$ and a second address $B+b$. This will permit the network QAE to determine, at the end of each iteration, the effect of the newly added bit upon the overall reconstruction error as will become apparent from the following description of network QAE given with reference to FIG. 3. With the emission of the second address, calculator AC also generates an enabling signal on lead 29.

Figure 3:
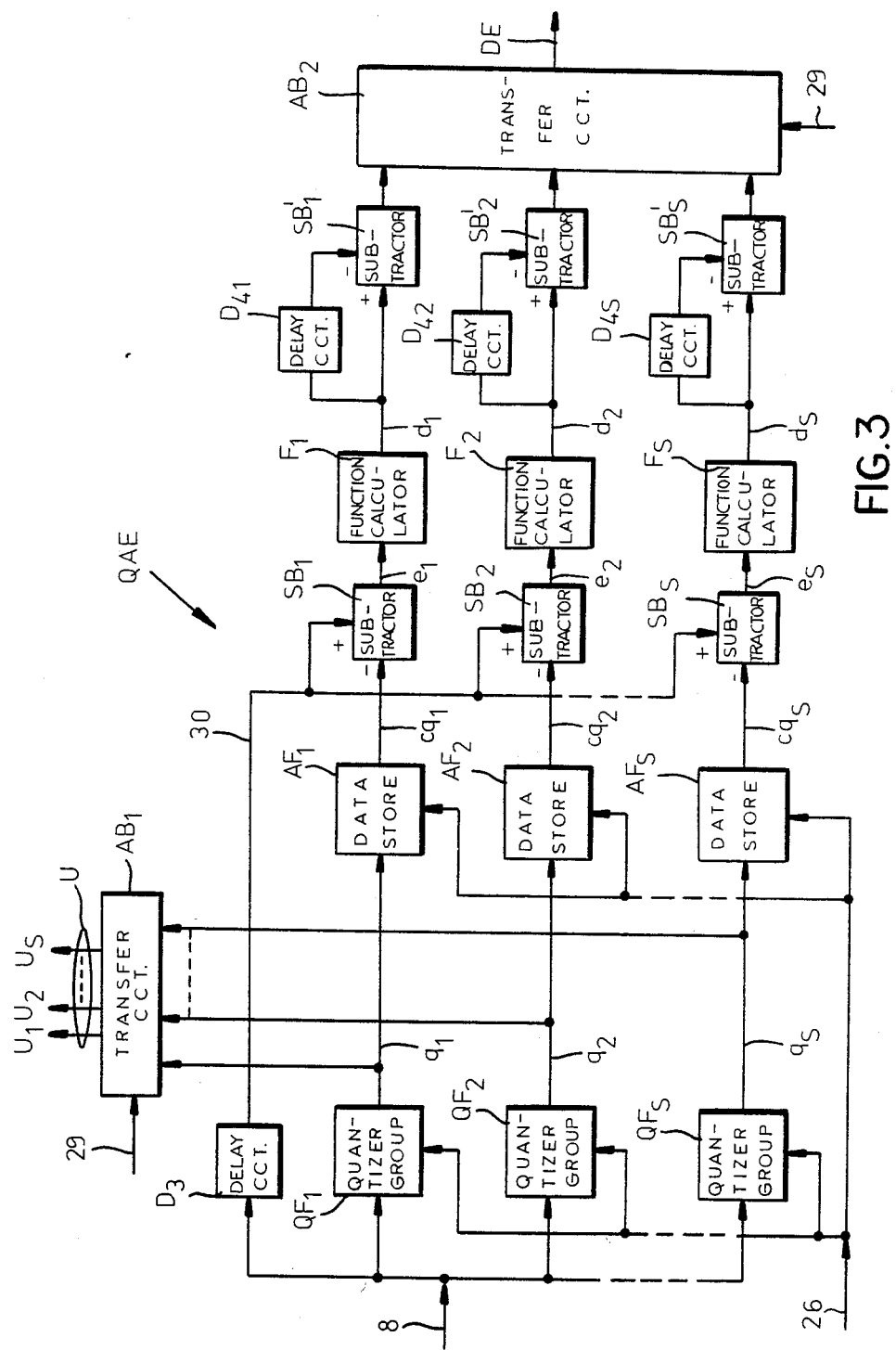
FIG. 3 shows further details of a quantizing network forming part of the coder of FIG. 2.

As shown in FIG. 3, network QAE comprises S quantizer groups $QF_1$, $QF_2$, ... $QF_S$ with inputs connected in parallel to the output line 8 of buffer register CB (FIG. 1) which carries during each iteration the uncoded coefficient $C_{ij}$ called forth at the address L by programmer AG of coder QCN. These groups have outputs $q_1$, $q_2$, ... $q_S$ extending on the one hand to respective data stores $AF_1$, $AF_2$, ... $AF_S$ and on the other hand to a transfer circuit $AB_1$ with outputs connected to line multiples $U_1$, $U_2$, ... $U_S$ of bus U. Quantizers $QF_1$-$QF_S$ and data stores $AF_1$-$AF_S$ also have other inputs connected in parallel to the line 26 originating at programmer AG. Outputs $cq_1$, $cq_2$, ... $cq_S$ of data stores $AF_1$-$AF_S$ extend to subtractive inputs of respective algebraic adders $SB_1$, $SB_2$, ... $SB_S$ also having additive inputs connected to a line 30 which receives the uncoded coefficient from line 8 via a delay circuit $D_3$ designed to retard the transmission of that coefficient for the time required by the activated quantizers and the data stores to complete their operations. Algebraic adders or subtractors $SB_1$, $SB_2$... $SB_S$ have outputs $e_1$, $e_2$, ... $e_S$ terminating at respective function calculators $F_1$, $F_2$, ... $F_S$ each similar in structure and operation to unit F of FIG. 1. These function calculators have outputs $d_1$, $d_2$, ... $d_S$ leading directly to additive inputs of respective subtractors $SB_1'$, $SB_2'$, ... $SB_S'$ and by way of respective delay circuits $D_{41}$, $D_{42}$, ... $D_{4S}$ to subtractive inputs thereof. Subtractors $SB_1'$-$SB_S'$ work into a transfer circuit $AB_2$ whose outputs are connected to bus DE and which, like transfer circuit $AB_1$, is activated by an enabling signal on lead 29 originating at unit AG. The delay introduced by circuits $D_{41}$-$D_{4S}$ corresponds to an interval between the emissions of addresses $B+(b-1)$ and $B+b$ referred to above.

In each iteration, the address appearing on line 26 selects one of the quantizers in each group $QF_1$-$QF_S$ which is thereby activated to code the incoming coefficient $C_{ij}$ with, first, the number of bits $(b-1)$ and, then, the number of bits b. Each of these groups includes a comparator which determines, among the quantization levels assigned to the activated quantizer, the highest level reached or surpassed by that coefficient. The number of these levels is defined by the maximum bit number B forming part of the address present on line 26, yet the quantum steps separating the levels from one another are different for the several groups $QF_1$-$QF_S$. A constant number of bits equal to the highest value of B is used for conveying to data stores $AF_1$-$AF_S$ and to transfer circuit $AB_1$ the magnitude of the coefficient being coded; this will be more fully explained below with reference to FIG. 8.

Data stores $AF_1$-$AF_S$, which are of the read-only type, include cells addressable by the combined information on lines $q_1$-$q_S$ and on line 26; each of these cells contains a value representing the quantized magnitude of the coefficient as given in each instance by the respective bit numbers $(b-1)$ or b and the height of a quantum step according to the coding mode of the respective group. This magnitude is delivered via lines $cq_1$-$cq_S$ to the corresponding subtractors $SB_1$-$SB_S$ which, from the actual value of the coefficient then present on line 30, determine the differences between the true and the coded magnitudes realized with each quantization mode. These differences are converted by calculators $F_1$–$F_S$ into partial-error functions transmitted to the additive and subtractive inputs of the associated algebraic adders $SB_1'$–$SB_S'$; owing to the delays introduced by circuits $D_{41}$–$D_{4S}$, these algebraic adders receive simultaneously the error functions due to the use of bit numbers (b−1) and b, respectively. The second, higher bit number generally will reduce the partial error; the differences calculated by these subtractors are fed to respective sections of register RE (FIG. 2) by way of summing circuit AD upon the enablement of transfer circuit $AB_2$ by the energization of lead 29. Function calculators $F_1$–$F_S$, selector MES and intervening circuitry act as discriminating means for identifying the group whose quantizers have contributed most effectively to a reduction of the overall reconstruction error.

Figure 8:
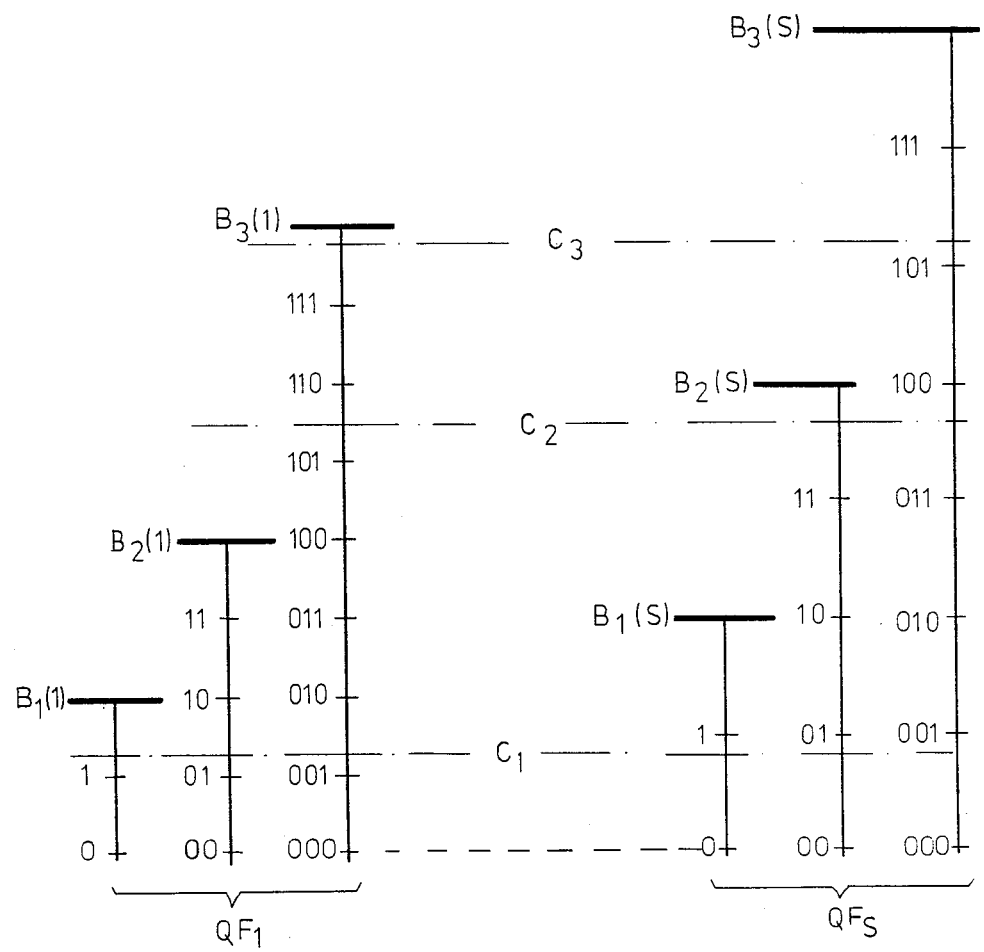
FIG. 8 is a table relating to the operation of a set of quantizers shown in FIG. 3.

We shall now refer to FIG. 8 for a more detailed description of the operation of quantizers $QF_1$–$QF_S$. In this Figure, by way of example, the first group $QF_1$ and the last group $QF_S$ have been represented diagrammatically in terms of bit numbers and quantum steps for three members of each group. These quantizers are identified by the maximum bit number B by which their respective levels may be coded. Thus, quantizers labeled $B_1(1)$ and $B_1(S)$ form part of a family with two levels, codable by a single bit. Another family includes quantizers labeled $B_2(1)$ and $B_2(S)$ with four levels, codable by two bits. An 8-level family, operating with up to three bits, includes members labeled $B_3(1)$ and $B_3(S)$. The members of any family differ from one another only in the height of their quantum steps.

Actually, the value $2^B$ defining the top level of each quantizer would require (B+1) bits for its coding. With b≦B, therefore, the binary sum B+b will uniquely define a family of quantizers regardless of the value of b. Programmer AG of FIGS. 2 and 7, accordingly, activates in each iteration a chosen quantizer family by emitting the address pair B+(b−1), B+b in line 26. The activated quantizer in each group compares the level or levels codable by the available (b−1) or b bits (readily calculated by subtracting B from the respective address) with the actual magnitude of the coefficient then present on line 8. The result of this comparison, indicating the highest codable level reached or surpassed by the coefficient being processed, is reported to data stores $AF_1$–$AF_S$ from the respective quantizer groups on line multiples $q_1$–$q_S$ all with the same number of leads corresponding to the number of bits needed for coding the highest level ($2^B$−1) with which the magnitude of any coefficient can be compared. If, for instance, this highest level were defined by B=3 (though in practice that value may be higher), each of these line multiples would consist of three wires carrying 3-bit combinations.

Let us consider, by way of example, three coefficients $C_1$, $C_2$ and $C_3$ of different magnitudes and with the assumption that a maximum number of 1, 2 and 3 bits can be respectively allocated to them. The one bit available for coding coefficient $C_1$ would have the logical value "1" in quantizer $B_1(1)$ and the logical value "0" in quantizer $B_1(S)$. As will be apparent, the first of these quantizers delivers a closer approximation of the actual magnitude. Coefficient $C_2$, upon having two bits allocated to it, would be coded by "11" in both quantizers $B_2(1)$ and $B_2(S)$; here, however, the second quantizer produces a smaller error as well as a better correction after allocation of the second bit. When coefficient $C_3$ is to be coded with only two bits by quantizers $B_3(1)$ and $B_3(S)$, the result would again be "11" in each instance.

When, however, a third bit is allocated to this coefficient, its quantized value will be "111" and "101", respectively; in this instance, the coding by quantizer $B_3(S)$ will be more accurate but quantizer $B_3(1)$ will provide the greater error reduction due to the allocation of the third bit.

Under the assumed conditions, the coding of coefficients $C_1$, $C_2$ and $C_3$ will cause the emission of word pairs 000/001, 001/011 and 011/111 by quantizer group $QF_1$ and of word pairs 000/000, 001/011 and 011/101 by quantizer group $QF_S$ to data stores $AF_1$ and $AF_S$, respectively. Only the second word of each pair is transmitted via transfer circuit $AB_1$, upon the occurrence of an enabling signal on lead 29, to buffer memories $P_1$ and $P_S$ (FIG. 1) by way of the corresponding multiples $U_1$ and $U_S$. Data stores $AF_1$–$AF_S$, also receiving the addresses of the selected quantizer families via line 26, determine from these addresses (by a procedure similar to that used in quantizer groups $QF_1$–$QF_S$) how many bits of words incoming via lines $q_1$–$q_S$ have actually been used for coding. Thus, for example, if coefficient $C_1$ were to be coded by all three quantizers $B_1(1)$, $B_2(1)$ and $B_3(1)$ of group $QF_1$, the resulting code words would be 001 in each instance, yet the first two zeroes emitted by quantizer $B_1(1)$ and the first zero emitted by the quantizer $B_2(1)$ would not be part of the actual coding. On the basis of this determination, data stores $AF_1$–$AF_S$ send out binary signals defining in absolute terms—i.e. with identical modes of digitization independent of the aforementioned quantum steps—the numerical values of the quantization levels represented by these data words. This information, transmitted via lines $cq_1$–$cq_S$ to subtractors $SB_1$–$SB_S$, yields S numerical differences between these quantization levels and the actual value of the coefficient then appearing on line 30 after being suitably delayed in circuit $D_3$. The differences so obtained, constituting partial errors, are fed via lines $e_1$–$e_S$ to function calculators $F_1$–$F_S$ which, like calculator F of FIG. 1, may simply square these errors to provide distortion data independent of the sign of the detected deviations.

As already explained, the error values generated by calculators $F_1$–$F_S$ in response to the first code word of each pair are delayed in circuits $D_{41}$–$D_{4S}$ so as to coincide with corresponding values derived from the associated second code words. Subtractors $SB_1'$–$SB_S'$, upon receiving the second set of error values on lines $d_1$–$d_S$, calculate the effect of the allocation of a further bit in terms of the differences between the two sets of values; these differences will usually be of negative sign since the second quantization with b bits will generally yield a smaller deviation than the first quantization with (b−1) bits.

On being enabled by a signal on line 29, transfer circuit $AB_2$ feeds the error-correcting output signals of subtractors $SB_1'$–$SB_S'$ via bus DE to the summing circuit AD of FIG. 2 to which error functions stored in respective sections of register RE are supplied via buses 20, 27 and delay circuit $D_2$. Summing circuit AD updates these error functions by the respective corrective values and supplies the result on bus 28 to the corresponding sections of register RE. The updated error functions are fed on bus 20 to selector MES which, by comparing them with one another, determines the quantizer group that has made the greatest contribution to the diminution of the overall reconstruction error. The identity of this group is represented by the selection signal s on line 10 and is also communicated to circuit DQC on line 21 terminating at comparator $CP_1$ (FIG. 6). Selector MES, of course, is functionless before the allotment of the first bit since all sections of register RE then contain the same initial error.

If the reconstruction error so updated has not yet been reduced to or below the threshold generated by selector TS, or if the number h of bits allotted to the block has not yet reached the minimum value $H_{min}$, leads 23 and 25 are energized as before to initiate another operating stage or iteration. Otherwise, or if the bit number h has attained the maximum value $H_{max}$, lead 13 is energized to activate the transfer circuit IC for the start of data transmission.

Upon such activation, circuit IC first extracts from register OH the information stored therein, namely the classification parameter k, the total bit count H and the selection signal s. Parameter k, of course, has remained constant throughout the coding process. Signal s, on the other hand, may have been updated from time to time if a change has occurred in the identity of the quantizer group most responsible for the reduction of the overall reconstruction error. All these data are transmitted to buffer register BL via line 16 as advance information for the remote receiver connected to channel CH. Thereafter, with multiplexer MUX in a position determined by the value of signal s as last updated, the contents of the corresponding buffer memory $P_1$-$P_S$ are read out to register BL. In the course of this readout, circuit IC passes only as many bits of each outgoing data word (consisting of a number of bits equal to the highest value of B, as explained with reference to FIG. 8) as are concurrently indicated by an output signal of bit-allocation circuit BAT (FIG. 2) present on line 12.

Being suitably programmed, a bit-allocation circuit in the remote receiver—similar to component BAT—establishes from the initially provided total bit number H and classification parameter k a table giving the full number of bits b allocated to all coefficients whose quantized values sequentially appear on channel CH. The receiver, therefore, is able to convert the bit or bit combination representing each coefficient into a numerical value based on the quantum-step height identified by the incoming selection signal s. The coded block can, accordingly, be replicated within the limit of allowable distortion represented by the threshold appearing in the output of circuit TS.

We claim:

1. A method of coding a two-dimensional data array for transmission of the contents thereof over a signal path with a minimum number of bits, comprising the steps of:
   (a) dividing the array into a multiplicity of data blocks each represented by a predetermined number of coefficients generated sequentially in a scanning of the array;
   (b) subjecting each data block individually to an iterative coding process with a succession of operating stages in which a progressively increasing number of bits are allotted to the block for a quantization of its coefficients, each stage involving the allocation of a newly allotted bit to one selected coefficient;
   (c) determining, prior to any bit allotment, an initial overall reconstruction error from the absolute magnitudes of all the coefficients to be quantized;
   (d) ascertaining in each stage the reduction of overall reconstruction error by the quantization of a selected coefficient with the successively allocated bits; and
   (e) upon detecting a final reduction of said overall reconstruction error to a limited residual value not exceeding an established distortion threshold, sequentially sending out the bits coding all the coefficients of the block, together with advance information enabling a remote receiver to reconstruct said coefficients within the limits of the residual value of said overall error.

2. The method defined in claim 1 wherein the identity of the coefficient selected for bit allocation in each stage is determined by a bit count totaled up to the respective stage, said advance information including the totality of the bit count after the final stage.

3. The method defined in claim 2 wherein, in the processing of each data block and prior to step (b), a barycenter of the signal energy represented by the coefficients thereof is located from said absolute magnitudes, the location of said barycenter within the block assigning the block to one of a multiplicity of classes, the identity of the coefficient selected for bit allocation in each stage being codetermined by the class to which the block has been assigned.

4. The method defined in claim 3 wherein said advance information further includes an identification of the class to which the block has been assigned.

5. The method defined in claim 2 wherein an attainment of a predetermined maximum by the total bit count causes a sending out of the bits, as in step (e), regardless of the residual value of said overall reconstruction error.

6. The method defined in claim 1 wherein the coefficient selected in any stage is subjected to a plurality of simultaneous quantizations according to different modes with the number of bits up to then allocated thereto, the effects of said quantizations upon said overall reconstruction error being separately determined in step (d) and the greatest reduction of said reconstruction error being used in step (e) for comparing the residual value thereof with said distortion threshold.

7. The method defined in claim 6 wherein the effects of the different modes of quantization are determined in each stage in terms of the contribution of the last-allotted bit to a reduction of said reconstruction error, the bits used in the quantization mode contributing most to the error reduction being sent out in step (e).

8. The method defined in claim 7 wherein said advance information includes an identification of the quantization mode contributing most to said error reduction.

9. The method defined in claim 7 wherein said contribution is measured as the square of the difference between two quantized values of the coefficient to which said last-allotted bit is allocated, said two quantized values being respectively obtained before and after the allocation of said last-allotted bit.

10. The method defined in claim 1 wherein said data array is an image converted by a line scan into a series of PCM samples from which said coefficients are derived by linear transformation.

11. The method defined in claim 1 wherein said threshold is modified between codings of successive data blocks in response to significant changes in the total number of bits allotted to different blocks previously coded.

12. A system for coding a two-dimensional data array whose contents are to be transmitted over a signal path with a minimum number of bits, comprising:

input means generating successive sequences of coefficients, each of said sequences being representative of the contents of a respective data block forming part of said array, the number of said coefficients being the same for all said data blocks;

register means connected to said input means for temporarily storing the coefficients of a given data block;

calculating means connected to said input means for computing an initial overall reconstruction error from the absolute magnitudes of all the coefficients stored in said register means;

iterative coding means for processing each data block to a succession of operating stages in which a progressively increasing number of bits are allotted to the block for quantization of its coefficients, said coding means including programming means connected to said input means for identifying a preselected coefficient in each of said stages, quantizing means connected to said register means for receiving therefrom the coefficient identified in each stage by said programming means and comparing such coefficient with several quantization levels, said programming means allocating in each stage a newly allotted bit to the preselected coefficient for the coding of the quantization level attained thereby, and arithmetic means connected to said quantizing means and to said calculating means for determining a reduction of said overall reconstruction error due to the allocation of a newly allotted quantizing bit to the coefficient identified in each stage by said programming means, said coding means further including comparison means for generating a transmitting command upon detecting a reduction of said reconstruction error to a limited residual value not exceeding an established distortion threshold;

output means connected to said quantizing means and controlled by said comparison means for delivering to said signal path, upon generation of said transmitting command and in the order of occurrence of the coefficients of a given block, the quantizing bits allocated thereto. and classification means connected to said input means for determining from the absolute magnitudes of the coefficients of each block the location therein of a barycenter of signal energy represented by said coefficients and emitting to said programming means a parameter identifying one of a predetermined multiplicity of classes to which a given block is assigned on the basis of said location, the preselection of a coefficient in each stage depending on the value of said parameter.

13. A system as defined in claim 12 wherein said programming means comprises different data stores assigned to said classes and enabled by respective values of said parameter, said coding means further including a bit counter advanced by said comparison means to establish another operating stage upon said reconstruction error failing to reach said residual value, said bit counter addressing an enabled data store in each stage for reading out the preselected coefficient from said register means and supplying said quantizing means with updated information concerning the number of quantization-coding bits allocated to the respective preselected coefficient.

14. A system as defined in claim 13 wherein said quantizing means comprises a multiplicity of quantizers divided into families with different numbers of quantization levels differing within each family by the quantum steps separating their levels, all quantizers with identical quantum steps forming a group, said programming means activating in each stage a family of quantizers assigned to the preselected coefficient by the enabled data store, said coding means further including discriminating means for simultaneously receiving coded values of the preselected coefficient from the activated family of quantizers and supplying said comparison means with the smallest magnitude of said reconstruction error as diminished by the simultaneous coding operations of the quantizers so activated.

15. A system as defined in claim 14 wherein said output means comprises a plurality of buffer memories respectively connected to said groups of quantizers for storing digitized information relating to the quantization levels used in the coding of each coefficient of a given block, transfer means responsive to said transmitting command for reading out bits forming part of said digitized information to said signal path, and multiplexer means interposed between said buffer memories and said transfer means for extracting said digitized information under the control of said discriminating means from the buffer memory connected to the group including that quantizer whose operating mode has contributed most to a reduction of said reconstruction error.

16. A system as defined in claim 15 wherein said digitized information is a bit combination representing the quantization level used in each of said groups for the coding of respective coefficients, said coding means further including storage means connected to said programming means for registering the total number of bits allocated to each of said coefficients, said transfer means being connected to said storage means for limiting the readout of each bit combination to the number of bits registered for each coefficient in said storage means, said transfer means preceding said readout with emission of information on the assigned class, the setting of said multiplexer means and the total number of allotted bits.

17. A system as defined in claim 16 wherein said output means further includes a buffer register inserted between said transfer means and said signal path for accumulating the bits read out before releasing same to said signal path, said coding means further including a signal source establishing said distortion threshold, said buffer register having an output connected to a control input of said source for modifying said distortion threshold in dependence upon the degree of loading of said buffer register by the bits read out after the processing of a preceding block.

18. A system as defined in claim 14 wherein each of said data stores comprises a plurality of tables emitting, in an enabled condition, the identity of a coefficient preselected in a current stage, a maximum number of coding bits allocable to the preselected coefficient, and the number of actual bits allocated in the current and past stages to the preselected coefficient, the digital sum of said maximum number and actual bits constituting an address and coding instruction for a family being activated.

19. A system as defined in claim 14 wherein said comparison means comprises a first comparator with inputs respectively connected to said discriminating means and to a first signal source establishing said distortion threshold, a seond comparator with inputs respectively connected to said bit counter and to a second signal source establishing a minimum bit count, and a third comparator with inputs respectively connected to said bit counter and to a third signal source establishing a maximum bit count, said comparison means generating said transmitting command under the joint control of said first and second comparators only after a number of stages at least equaling said minimum bit count and in the presence of said limited residual value, said comparison means further generating said transmitting command under the sole control of said third comparator upon the number of stages equaling said maximum bit count.

* * * * *